US012755297B2

(12) United States Patent
Goksel et al.

(10) Patent No.: US 12,755,297 B2
(45) **Date of Patent: *Oct. 6, 2026**

(54) SYSTEM AND METHOD FOR DIGITAL ADVERTISING CAMPAIGN OPTIMIZATION

(71) Applicant: ACK Ventures Holdings, LLC, Boca Raton, FL (US)

(72) Inventors: Mehmet Kartal Goksel, New York, NY (US); Jeremy Sadwith, Brooklyn, NY (US); Christopher Keune, Brooklyn, NY (US); Harry Kargman, New York, NY (US)

(73) Assignee: ACK Ventures Holdings, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,980

(22) Filed: Dec. 13, 2024

(65) Prior Publication Data

US 2025/0278757 A1 Sep. 4, 2025

Related U.S. Application Data

(63) Continuation of application No. 17/728,039, filed on Apr. 25, 2022, now Pat. No. 12,190,347, which is a (Continued)

(30) Foreign Application Priority Data

Jun. 30, 2016 (GB) ..................................... 1611384

(51) Int. Cl.

*G06Q 30/02* (2023.01)
*G06N 20/10* (2019.01)

(Continued)

(52) U.S. Cl.

CPC ......... *G06Q 30/0244* (2013.01); *G06N 20/10* (2019.01); *G06Q 30/0242* (2013.01);

(Continued)

(58) Field of Classification Search

CPC ........... G06Q 30/0244; G06Q 30/0242; G06Q 30/0245; G06Q 30/0269; G06Q 30/0277; G06N 20/10

See application file for complete search history.

(56) References Cited

U.S. PATENT DOCUMENTS 7,130,807 B1 10/2006 Mikurak
8,341,047 B1 * 12/2012 Furney .............. G06Q 30/0241 705/35

(Continued)

FOREIGN PATENT DOCUMENTS

WO 2013/188953 A1 12/2013
WO 2014/149608 A1 9/2014
WO 2017/040578 A1 3/2017

*Primary Examiner* — Thuy N Nguyen

(74) *Attorney, Agent, or Firm* — McCarter & English, LLP

(57) ABSTRACT

A technique for dynamically adjusting a digital advertising campaign during an active campaign flight is discussed. Using feedback from a digital survey over an exposed audience of user populations, brand lift may be calculated on a per ad creative and/or per site basis. User characteristics derived from content consumption patterns may be used to optimize ongoing campaigns and formulate target audiences and target creative formats for new campaigns.

14 Claims, 9 Drawing Sheets

Related U.S. Application Data continuation of application No. 16/311,907, filed as application No. PCT/GB2017/051941 on Jun. 30, 2017, now Pat. No. 11,315,143.

(51) Int. Cl.
*G06Q 30/0241* (2023.01)
*G06Q 30/0242* (2023.01)
*G06Q 30/0251* (2023.01)

(52) U.S. Cl.
CPC ..... *G06Q 30/0245* (2013.01); *G06Q 30/0269* (2013.01); *G06Q 30/0277* (2013.01)

(56) References Cited

U.S. PATENT DOCUMENTS 8,402,387 B1 * 3/2013 Iversen .............. G06Q 30/0242 715/789
8,600,830 B2 12/2013 Hoffberg
8,755,837 B2 6/2014 Rhoads et al.
9,165,308 B2 10/2015 Cook
9,292,493 B2 3/2016 Chandramouli et al.
9,619,824 B2 * 4/2017 Doumet ............. G06Q 30/0267
9,818,136 B1 11/2017 Hoffberg
9,922,345 B2 3/2018 Mikurak
10,115,124 B1 * 10/2018 Kamvysselis ...... G06Q 30/0244
11,315,143 B2 4/2022 Goksel et al.
12,190,347 B2 1/2025 Goksel et al.
12,254,488 B2 3/2025 Rusiecki et al.
2007/0027754 A1 * 2/2007 Collins .............. G06Q 30/0212 705/14.48
2008/0114639 A1 * 5/2008 Meek ................. G06Q 30/0242 705/14.69
2008/0294523 A1 * 11/2008 Little ................. G06Q 30/0277 705/14.49
2010/0082411 A1 4/2010 Goyal et al.
2010/0100415 A1 4/2010 Plummer et al.
2010/0293063 A1 11/2010 Atherton et al.
2010/0317420 A1 12/2010 Hoffberg
2010/0324999 A1 12/2010 Conway et al.
2011/0137721 A1 * 6/2011 Bansal ................... G06Q 30/02 705/14.41
2011/0191140 A1 8/2011 Newman et al.
2011/0191170 A1 * 8/2011 Zhang ................ G06Q 30/0247 705/14.46
2011/0231264 A1 * 9/2011 Dilling ............... G06Q 30/0275 705/14.71
2011/0295762 A1 12/2011 Scholz et al.
2012/0054607 A1 * 3/2012 Otsuka .................. G06F 9/4411 715/705
2012/0059707 A1 * 3/2012 Goenka .............. G06Q 30/0241 705/14.67
2012/0089455 A1 * 4/2012 Belani ................ G06Q 30/0245 705/14.44
2012/0124037 A1 * 5/2012 Lee ....................... G06F 16/432 707/E17.084
2012/0130802 A1 * 5/2012 Shimizu ............. G06Q 30/0245 705/14.44
2012/0254333 A1 10/2012 Chandramouli et al.
2012/0323674 A1 12/2012 Simmons et al.
2013/0018719 A1 * 1/2013 Abraham ........... G06Q 30/0242 705/14.41
2013/0081081 A1 3/2013 Wang
2013/0124298 A1 * 5/2013 Li ...................... G06Q 30/0241 705/14.42
2013/0138428 A1 5/2013 Chandramouli et al.
2013/0165143 A1 * 6/2013 Ziskind ................... H04W 4/02 455/456.1
2013/0273968 A1 10/2013 Rhoads et al.
2013/0325530 A1 12/2013 Pal et al.
2014/0040008 A1 2/2014 Belani et al.
2014/0046777 A1 2/2014 Markey et al.
2014/0089782 A1 * 3/2014 Cook .................... G06F 16/957 715/234
2014/0120864 A1 * 5/2014 Manolarakis ........... H04W 4/23 455/405
2014/0195345 A1 * 7/2014 Lyren ................. G06Q 30/0271 705/14.67
2014/0244406 A1 * 8/2014 Garcia-Martinez .......................... G06Q 30/0277 705/14.73
2014/0278930 A1 9/2014 Brixius et al.
2014/0279056 A1 * 9/2014 Sullivan ............. G06Q 30/0275 705/14.71
2014/0279793 A1 * 9/2014 Wohlstadter ....... G06Q 30/0277 706/46
2014/0297404 A1 10/2014 Bruich
2014/0358667 A1 * 12/2014 Beltramo, Jr. ..... G06Q 30/0243 705/14.42
2015/0006295 A1 1/2015 Liu et al.
2015/0025948 A1 1/2015 Sankaran et al.
2015/0127310 A1 5/2015 Grandison et al.
2015/0254566 A1 9/2015 Chandramouli et al.
2015/0254732 A1 9/2015 Snyder
2015/0269628 A1 * 9/2015 Urtso ................. G06Q 30/0269 705/14.66
2015/0278387 A1 10/2015 Stergiou et al.
2015/0302436 A1 10/2015 Reynolds
2015/0310494 A1 10/2015 Goldberg et al.
2015/0379556 A1 * 12/2015 Udassin ............. G06Q 30/0275 705/14.42
2016/0026920 A1 * 1/2016 Sullivan ................ G06F 16/438 706/11
2016/0055542 A1 * 2/2016 Hui .................... G06Q 30/0255 705/14.66
2016/0065655 A1 3/2016 Bentley et al.
2016/0132938 A1 * 5/2016 Wiener .............. G06Q 30/0255 705/14.66
2016/0162954 A1 * 6/2016 Kang ................. G06Q 30/0226 705/14.27
2016/0210660 A1 * 7/2016 Flynn ....................... H04W 4/23
2016/0210671 A1 * 7/2016 Seljan ................ G06Q 30/0277
2016/0254970 A1 * 9/2016 Bartholomew ....... H04L 67/535 709/224
2016/0260135 A1 * 9/2016 Zomet ................... H04L 67/535
2016/0357501 A1 * 12/2016 Burton ............... G06Q 30/0201
2016/0358205 A1 12/2016 Beltramo, Jr.
2017/0091810 A1 3/2017 McGovern et al.
2017/0178193 A1 * 6/2017 Jagannath .............. G06Q 30/04
2017/0351978 A1 * 12/2017 Bellowe ................. G06Q 50/01
2019/0205919 A1 7/2019 Goksel et al.

* cited by examiner

Host Server 500
Programmatic Advertising Platform 530
Publisher Web Page 510
Site-specific AdTag 510a
Network 550
Third party location holding Ad Creatives 540
Publisher Ad Server 515
Creative 515a
Pubisher -specific Tag 515b
Creative 515c
User Computing Device 501
Browser 501a
External Data Sources 520
User 502

SYSTEM AND METHOD FOR DIGITAL ADVERTISING CAMPAIGN OPTIMIZATION

RELATED APPLICATION

This application is a continuation of U.S. patent application Ser. No. 17/728,039, filed Apr. 25, 2022, which is a continuation of U.S. patent application Ser. No. 16/311,907, filed Dec. 20, 2018, now U.S. Pat. No. 11,315,143, which is a 35 U.S.C. § 371 national stage filing of International Application No. PCT/GB2017/051941, filed on Jun. 30, 2017, which claims priority to United Kingdom Patent Application No. 1611384.7, entitled "System and Method for Digital Advertising Campaign Optimization", filed Jun. 30, 2016, the contents of each of the foregoing applications incorporated herein by reference in their entirety.

BACKGROUND

To prepare and initiate a digital advertising campaign, multiple different plan components are brought together. A sales team completes proposals for advertising campaigns with agencies and brands. The proposals include dates, targeting, budgets, rates, and campaign goals. These proposals also include potential website lists. Publisher Managers secure inventory/available ad slots from publishers within a host server's network. The proposals determine which ad creative types are valid on each site. Account Managers use internal tracking tools to document campaign details, including impressions and cost. Media Planners determine the number of ad impressions that will run on inventory sources. Brand assets, including images, videos, and text are sourced from the client. A design team uses these assets to create advertisements. Campaign Managers collect advertisements from designers and work with engineers to ensure that ad units render properly. Creative code associated with an advertisement is uploaded to an ad server and trafficked to targeted digital properties across mobile web, app and third party locations where a page is rendered and advertising can be served in accordance with the parameters of a campaign flight during the advertising campaign.

Most publishers have access to their own ad server, whether their own or licensed from a third party, and each page on their website has several ad placements or ad slots which make a request to the ad server. These placements are characterized based on their size and location on the page. Each request to fill an available ad slot returns an ad creative (an advertisement) for display in the requesting slot. The ads that are served to the web page may be part of a larger overall advertising campaign taking place over numerous websites.

BRIEF SUMMARY

Embodiments of the present invention provide a technique for dynamically adjusting a digital advertising campaign during a campaign flight. Using feedback from digital survey results and the behaviors of consumers seeing the advertisements from segmented selected user populations, brand lift and other responses may be programmatically calculated on a per ad creative and/or per property website basis. The campaign can be dynamically directed to increase displays of one form of ad creatives identified as providing desired brand lift over that of other forms which may be under-performing. Further, digital ad creatives for the campaign can be reallocated in greater numbers to websites or other digital properties determined to be providing greater brand lift while websites and digital properties not performing in a satisfactory manner can be allocated a lesser amount of ad creatives for display. User characteristics derived from editorial consumption patterns may be used to optimize ongoing digital advertising campaigns and to formulate target audiences for new digital advertising campaigns. Further embodiments enable optimization ad creatives based upon observing consumer behavior and then changing or optimizing which ad creative to serve to which digital properties based upon the observations.

In one embodiment, a method for optimizing a digital advertising campaign includes initiating a digital advertising campaign for an advertiser, the digital advertising campaign displaying one or more ad creatives on one or more digital properties during an advertising campaign flight. The method also includes acquiring performance data regarding the display of the one or more ad creatives during the campaign flight and identifying one or more users that have viewed at least two ad creatives being displayed in the digital advertising campaign. The method further includes providing a digital survey during the campaign flight of the digital advertising campaign to more than one user, answers of the users to the digital survey forming survey results. The method also includes analyzing programmatically the survey results and the performance data to calculate a success value for at least some of the ad creatives, the success value being a relative value indicative of a displayed ad creative providing an attribute previously specified by the advertiser. The method further includes adjusting an allocation of a display of the ad creatives among the digital properties based on the calculated results provided by at least some of the ad creatives.

In another embodiment, a method for deriving user characteristics via content consumption patterns includes identifying a training set of data of content consumption patterns of digital data by known users and providing the training set of data to a machine learning algorithm to train the machine learning algorithm. The method also includes providing the training set of data to a pattern recognition algorithm to train the pattern recognition algorithm and acquiring a set of data of content consumption pattern of digital data by unknown user. The set of data of the content consumption pattern of digital data by the unknown user is provided to the trained machine learning algorithm. The method further includes receiving user characteristics derived from the set of data of the content consumption pattern of digital data by the unknown user from the trained machine learning algorithm and adjusting an existing campaign flight for a digital advertising campaign based on the derived user characteristics.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Site-Specific Ad Tag

Advertisers expect that their ad creatives will appear and function as they want across all digital properties on which their ads run. At the same time, publishers enforce restrictions on how ads appear and function on their digital properties. Typical ad creatives served across a network of websites or other digital properties often fail to meet either the advertiser need for brand control or the publisher need for digital property control as ad creatives are configured to appear and function almost identically across digital properties. Typical ad tech can only address this issue by creating separate instances of each ad creative to run on each different type of website or other digital property. There is little control for the publisher, advertiser or ad tech firm without investing substantial time and effort and so customization of the ad creative for an individual digital property is often fixed ahead of time thereby limiting the flexibility with which digital content can be presented.

For ease of explanation herein, embodiments will be mostly be described herein with respect to web pages but the descriptions made in relation to web pages should be understood to also apply to other digital properties. Digital properties may include, but are not limited to, downloadable applications, content services within applications, digital services on home automation devices, digital services on wearable devices, and mobile WebKit-based browsers including those provided by social media companies. For example, the digital property may be a mobile WebKit browser within: Facebook®, Twitter® and content pages within Snapchat® Discover, Google® Accelerated Mobile Pages (AMP), Facebook® Instant Articles (FIA), Apple News Reader, Flipboard, and other digital locations where advertising needs to run.

Figure 1:
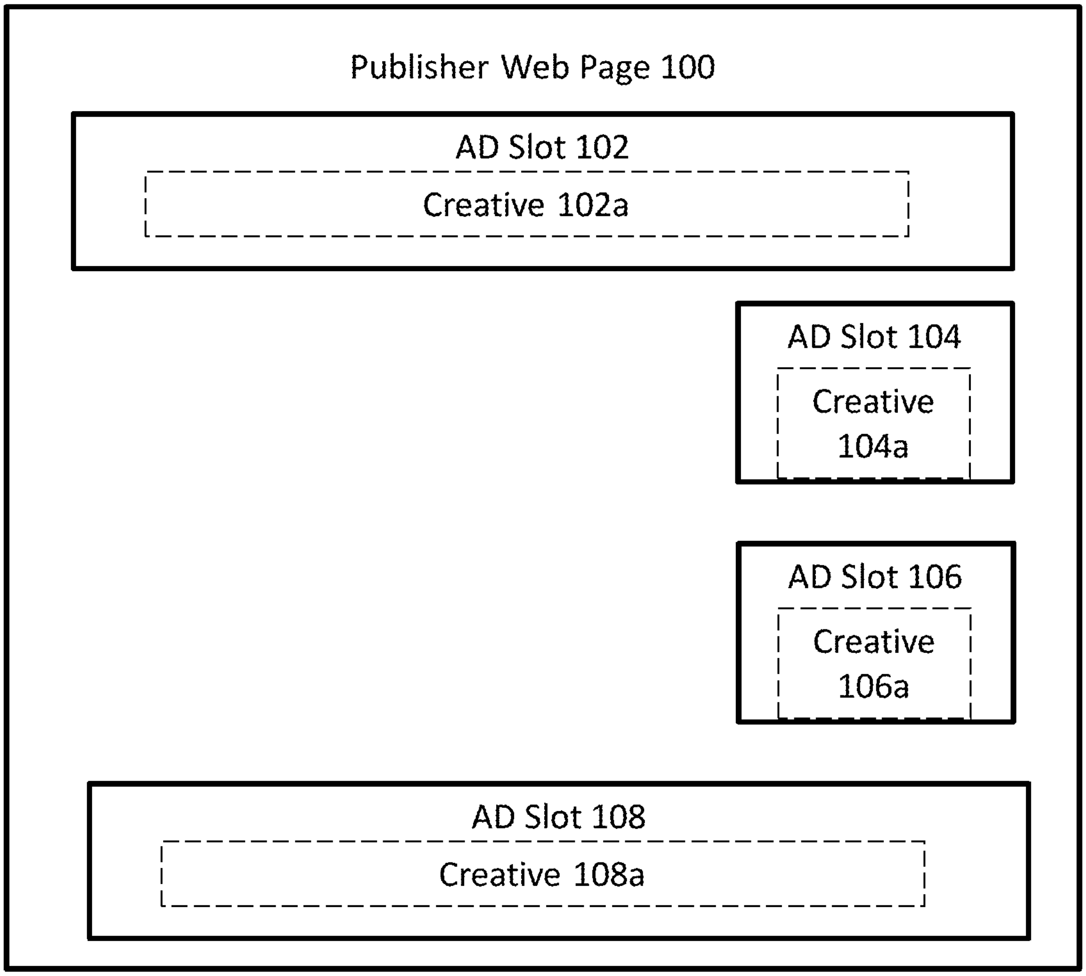
Figure 1 (prior art)
FIG. 1 (prior art) depicts a conventional web page with a number of ad slots and corresponding ad creatives.

FIG. 1 (prior art) depicts a conventional web page with a number of ad slots and corresponding ad creatives. For example, a publisher web page 100 may include ad slots 102, 104, 106 and 108. Ad creatives (advertisements) 102*a*, 104*a*, 106*a* and 108*a* may display in ad slots 102, 104, 106 and 108. The ad creatives 102*a*, 104*a*, 106*a* and 108*a* may be retrieved from the publisher's own ad server or from another source and sized to fit a particular ad slot 102, 104, 106 and 108. For example, one ad slot may be for a top banner 102 running along the top of a web page 100 and one ad slot 108 may be for a bottom banner displayed across the bottom of the web page. Additional ad slots 104 and 106 may be sized to display smaller ad creatives on a designated side of the web page 100. Further, the publisher may desire that certain ad slots display static images while dynamic ads involving motion may be allowed in other locations on the web page 100. The size and type of allowed ad creatives desired by the publisher for the available ad slot are sent to the ad server as part of the request for an ad creative. The ad server receiving the request for the ad creative attempts to identify an ad creative that meets the request requirements and returns it to the web page for display. The ad server may maintain its own content location from which to serve the ad or may relay the request to a 3$^{rd}$ party content location for fulfillment.

Embodiments of the present invention provide a technique for digital ad configuration that makes it possible to simply and adaptably manage both the publisher and advertiser needs. Ad creatives may be requested using configuration data specific to a publisher's website and formed in part from external data relating to the user and/or requesting web page that is dynamically retrieved at the time of the request. In one embodiment, a host server serves ad creatives through a publisher website by initially providing the publisher with a publisher-specific tag that the publisher can traffic in the publisher's ad server as if it were an ad creative. The publisher-specific tag may be a JavaScript tag or other executable code. Each of these publisher-specific tags is used to reference a set of options for host server-defined ad placements for the particular publisher. As the host server may only be one of many creatives in a publisher's ad server, there is often no guarantee that an ad from the host server may be on a given page at a given time. However, once the host server's publisher-specific tag is written to the publisher's web page as an ad creative, it pulls down (requests) a version of the host server's Ad Tag configuration that is specific to that publisher website. This Ad Tag configuration that is specific to the publisher's website is referred to herein as a "site-specific Ad Tag". In one embodiment the site-specific Ad Tag code includes previously stored custom configurations for host server-defined ad placements on the requesting publisher's website. As explained further below, the site-specific Ad Tag may also include publisher rules for displaying ad creatives.

In an embodiment, the code for the site-specific Ad Tag is retrieved from the host server to the web page through the use of a unique ID in the publisher's ad server. The site-specific Ad Tag that is retrieved contains a particular set of options for the publisher's website. It should be appreciated that different variations of publisher-specific tags referencing different sets of configuration options may be stored in the same publisher ad server which would result in different types of ad creatives being requested.

In one embodiment, before requesting the ad creative, the site-specific Ad Tag may request data from external sources to retrieve characteristics of the requesting user and the web page from which the request originates. Different external sources can be enabled or disabled as possible data sources based on that website's configuration data included in the site-specific Ad Tag. In other words, the site-specific Ad tag for a particular website publisher may list certain external sources as authorized sources for the external data and prohibit retrieving external data from other external sources. In one embodiment, the external data retrieved by the site-specific Ad Tag may include contextualization data and/or site visit metrics retrieved from a third party. In another embodiment, the external data may include data regarding user browsing behavior, such as, but not limited to the amount of dwell time (an average length of time a user was on a page with the window in focus) and/or an the amount of time a user spent viewing a previous ad creative. In an embodiment, the external data may also include, but is not limited to, user interaction metrics with an ad on the web page, user location, phone or carrier type, scroll depth, scroll speed, viewability data, likelihood to engage data, user-defined advertising preferences and user interaction with previously seen ads. It will be appreciated that other types of external data in addition to or in place of the types of external data specifically listed herein that may be used to form a request for an ad creative are also within the scope of the present invention. These external data sources are polled for data related to the current web page and/or user visiting the page. This data may be used as targeting parameters by the site-specific Ad Tag when requesting an ad creative and may later be used as parameters for advertising campaigns to target.

Once the site-specific Ad Tag has collected data from external sources, it may prepare a request for an ad creative. The configuration data defines what creative types are permitted and each creative type has a corresponding size that is added to the ad creative request. Exemplary creative types include without limitation top banner, middle banner, bottom banner and custom creative types. While a web page may need only one instance of the site-specific Ad Tag as one instance can handle making requests for multiple ad placements, it should be appreciated that the web page may contain multiple instances of a site-specific Ad Tag and the multiple site-specific Ad Tags may interact with each other in the display of one or more ad creatives.

For each ad placement, the site-specific Ad Tag may make a request to a programmatic advertising platform for a programmatic ad response. For example, the programmatic advertising platform may be the host server's own Supply Side Platform (SSP). In one embodiment, the site-specific Ad Tag sends along some of the targeting parameters it gathered before any ad slot/placement-specific information. In one embodiment, if the programmatic advertising platform returns no ad creative, or is disabled for a specific website, the site-specific Ad Tag makes a request to another location for ad creatives such as a publisher ad server. It will be appreciated that the publisher ad server may be a third party publisher not associated with the publisher hosting the publisher website described herein. For example, in one embodiment, the publisher ad server may be the host server's DFP account (Google's Doubleclick for Publishers™) or may be a third party publisher ad server not associated with either the entity controlling the host server or the publisher whose website is making the request for the ad creative. The site-specific Ad Tag may employ a waterfall model where a number of content sources are checked in a pre-determined sequence or in parallel until a creative responsive to the request is identified. The site-specific Ad Tag may pass similar targeting parameters and placement specific information to the publisher ad server as it did to the programmatic advertising platform. In an embodiment, if the programmatic advertising platform and the publisher ad server return no ad, the placement could go unfilled and not have any ad to display. In another embodiment, additional locations providing ad creatives could be searched after the initial failure to return a valid ad creative. The configuration data for the site-specific Ad Tag may include which services may be checked for ad creatives in response to a request. In one embodiment, the site-specific Ad Tag may attempt to find a valid ad creative response from multiple sources including through the use of programmatic deals, direct campaigns and passback sources. The site-specific Ad Tag may try each allowed service until it receives a valid ad creative in response. In one embodiment, each host server-defined placement can also have custom JavaScript code known as a passback in the event a responsive ad creative cannot be retrieved via the site-specific Ad Tag. This passback code is meant to inform the publisher of the need to separately fill the request for the ad creative so that the publisher does not miss out on the opportunity to monetize a possible ad impression.

Once the site-specific Ad Tag has received a valid ad creative in response to the request, it parses the creative code to identify custom code, which may be in the form of HTML or another markup language that contains information specific to how the creative should be displayed. This information includes a format type and tells the site-specific Ad Tag how it should display the creative (where on the screen should it appear, whether it should animate into view, whether it should stay on screen when the user scrolls, etc.). For an ad creative directly supplied by the host server, the format included in the custom HTML may be previously added to the ad creative by the entity controlling the host server prior to the creative being trafficked. For a programmatically supplied ad creative the custom HTML may be inferred from the DSP or other platform such as by using sizes, slot positions and prices and/or other criteria. Each ad creative may have its own configuration that will be combined with the publisher's configuration for that ad creative type. This allows specific settings of the ad creative provided by the advertiser to be overridden based on a publisher's requirements. After reconciling the configuration data, the site-specific Ad Tag then renders the creative according to its own custom logic determined and standardized by the creative type.

In one embodiment, after the ad creative has been displayed, the site-specific Ad Tag continues to monitor the displayed ad creative for its placement and visibility on the page while also monitoring each of the other ad creatives on the current page. The displayed ad creatives may animate, hide, or change visibility based on other ad creatives on the page and their formats. The continued monitoring by the site-specific Ad Tag allows the site-specific Ad Tag to alter the ad creative after rendering depending on custom rules defined by creative type. These rules also allow individual creatives to affect the behavior of other creatives on the page monitored by the Ad Tag. For example, in one embodiment, the site-specific Ad Tag keeps track of other ads from the host server on the page, and only allows a single ad to appear on the screen at all times. In another embodiment, the site-specific Ad Tag monitors the situation where a user scrolls down and one ad creative drops off the screen and another ad creative loads. This continued monitoring allows for enforcement of publisher rules. In one embodiment, publisher rules for competitive separation between advertisers are enforced to ensure that competitor's advertisements are not being displayed simultaneously or in immediate proximity to each other. Similarly, publisher rules regarding frequency capping which limit the number of times the same ad creative can be viewed back to back in a single session may be enforced.

The continued monitoring also may ensure that the web page does not become covered in ads. Such monitoring is important because ads can appear on any part of the screen, and some ad formats can even adhere to various portions of the screen. For example, a hover ad is a banner that adheres to the bottom of the screen. Its location persists as the user scrolls down the page. If another ad enters the viewport, the hover is hidden until the viewport is clear of other ads. Such continued monitoring by the site-specific Ad Tag allows for customized creatives such as two ad creatives s interacting with each other, creative tracking and error reporting, and ad targeting across publishers in a large networks.

Figure 2:
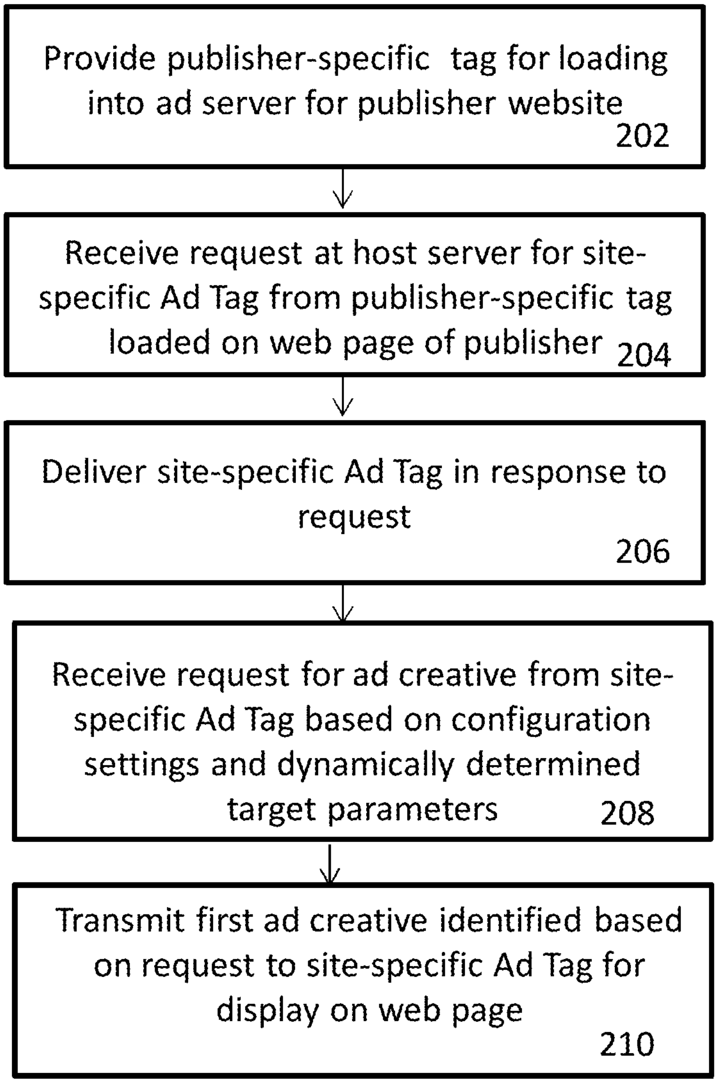
FIG. 2 depicts an exemplary sequence of steps followed by an embodiment of the present invention to serve an ad using a site-specific Ad Tag.

FIG. 2 depicts an exemplary sequence of steps followed by an embodiment of the present invention to serve an ad creative using a site-specific Ad Tag. The sequence begins with a host server providing a publisher-specific tag, such as a JavaScript tag, to a publisher for inclusion among ad creatives being trafficked in the publisher's ad server (step 202). The publisher-specific tag includes a unique ID that corresponds to a set of configuration options developed by the entity controlling the host server for the publisher's web site. In one embodiment the publisher-specific tag is associated with a specific ad slot on a web page. Subsequently, a request to the publisher ad server for an ad creative for a web page on the publisher's website results in the publisher-specific tag being loaded on a web page. The loading triggers a request to the host server for a site-specific Ad Tag (step 204). The host server delivers the site-specific Ad Tag which includes data for pre-defined custom configurations for ad creatives that are to be displayed on the specific publisher website in response to the request (step 206) (as described further below, in an alternate embodiment, the site-specific Ad Tag may be part of and load with the rest of the publisher's web page and not have to be dynamically retrieved from the host server). The site-specific Ad tag handles the ad creative requests for the ad slots on the page. The site-specific Ad Tag may also include a tracker to confirm the number of times that the publisher-specific tag has been used by the publisher. Before requesting the ad creative, the site-specific Ad Tag dynamically determines additional target parameters to form the request by incorporating data retrieved from external data sources. In one embodiment, an indication of the authorized external data sources for the particular publisher is included in the configuration data of the site-specific Ad Tag. This external data may include checking with third party sources to acquire contextualization data and/or site visit metrics to determine additional information about a user visiting the publisher web page and/or data regarding web page traffic. After acquiring the external data, a request for an ad creative satisfying the publisher specific configuration requirements and the dynamically determined targeting parameters is sent by the site-specific Ad Tag. In one embodiment, the request is initially received by a programmatic advertising platform (step 208). The programmatic advertising platform may be associated with the entity controlling the host server. In another embodiment, the request may be received by a publisher ad server. In another embodiment, the request may be received by another location holding ad creative content, including third party locations not associated with the entity controlling the host server. It will be appreciated that the request may indicate which ad creative sources may be used to satisfy the request and may indicate an order in which the sources are contacted. Once a first ad creative satisfying the request is identified, the first ad creative is returned to the requesting site-specific Ad Tag for display on the web page (step 210). The site-specific Ad Tag may send data back to the host server regarding each ad impression.

In one embodiment, the site-specific Ad Tag, upon receiving the first ad creative, may override specific settings for the first ad creative that conflict with the publisher requirements. For example, an advertiser setting that may be in conflict with the publisher configuration may be a minor setting that is not included in the parameters contained in the request for the ad creative but nonetheless need to be complied with before the ad creative is displayed on the publisher web page. For example, an advertiser may opt to include visual and experiential effects in their ad creative that the publisher may choose not to authorize. In this case, the publisher preference will override the creative-specified setting.

Figure 3:
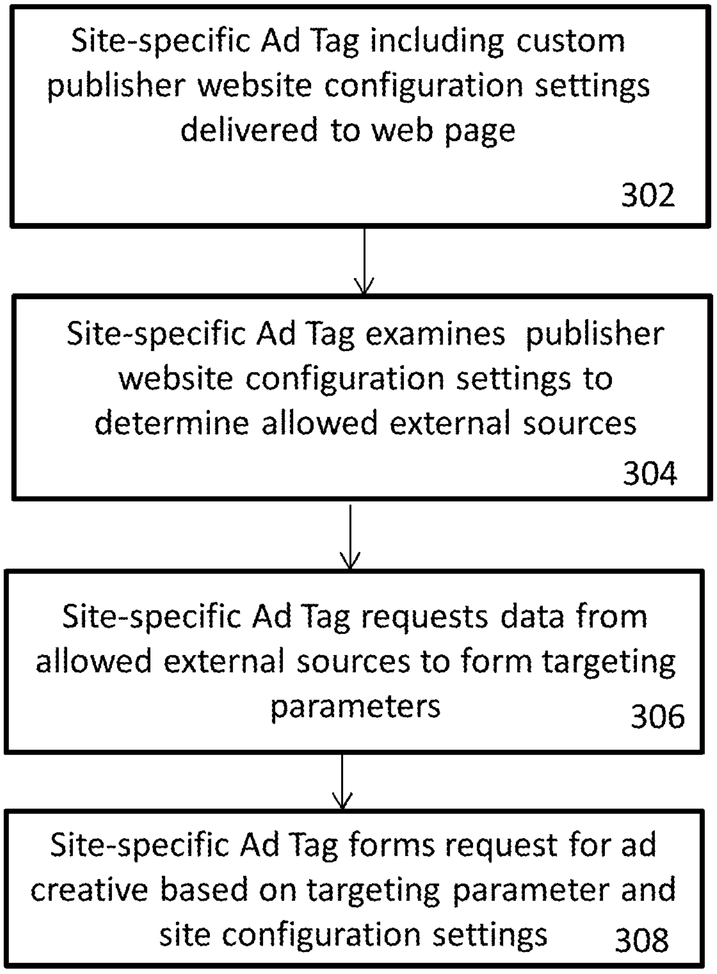
FIG. 3 depicts an exemplary sequence of steps followed by an embodiment of the present invention to identify targeting parameters for a request for an ad creative using a site-specific Ad Tag.

FIG. 3 depicts an exemplary sequence of steps followed by an embodiment of the present invention to identify targeting parameters for a request for an ad creative using a site-specific Ad Tag. The sequence begins with a site-specific Ad Tag being delivered to the publisher's web page (step 302). In an alternate embodiment, the site-specific Ad Tag is part of the web page and is loaded with the web page. Upon receiving a request for an ad creative from a publisher-specific tag as described herein, the site-specific Ad Tag consults its configuration data to determine allowed external data sources from which it is authorized to request data (step 304). The site-specific Ad Tag requests data from authorized external sources to identify data such as data about the user visiting the publisher web page and page/website traffic data (step 306). In one embodiment, the external data may be contextualization data such as provided by a keyword targeting system for editorial content such as provided by Grapeshot™. In one embodiment, the external data may be site metric data such as provided by a data management platform such as provided by Krux™. In another embodiment, the external data may be data regarding user dwell time and the amount of time that a user has viewed an ad creative such as data provided by a measurement or analytics platform providing attention and/or viewability data such as provided by MOAT™ IAS™ or DoubleVerify™. It will be appreciated that the data sources are not necessarily exclusive and data from multiple sources may be requested and acquired from the site-specific Ad Tag, either simultaneously or asynchronously. The retrieved data may be used by the site-specific Ad Tag to form targeting parameters for a request for an ad creative for the publisher web page (step 308). The requested targeting parameters include, but are not limited to, size, positional targeting, 3rd party user measurement ID, format targeting (valid ad creative types), contextual targeting anti-targeting, page info and device info.

Figure 4:
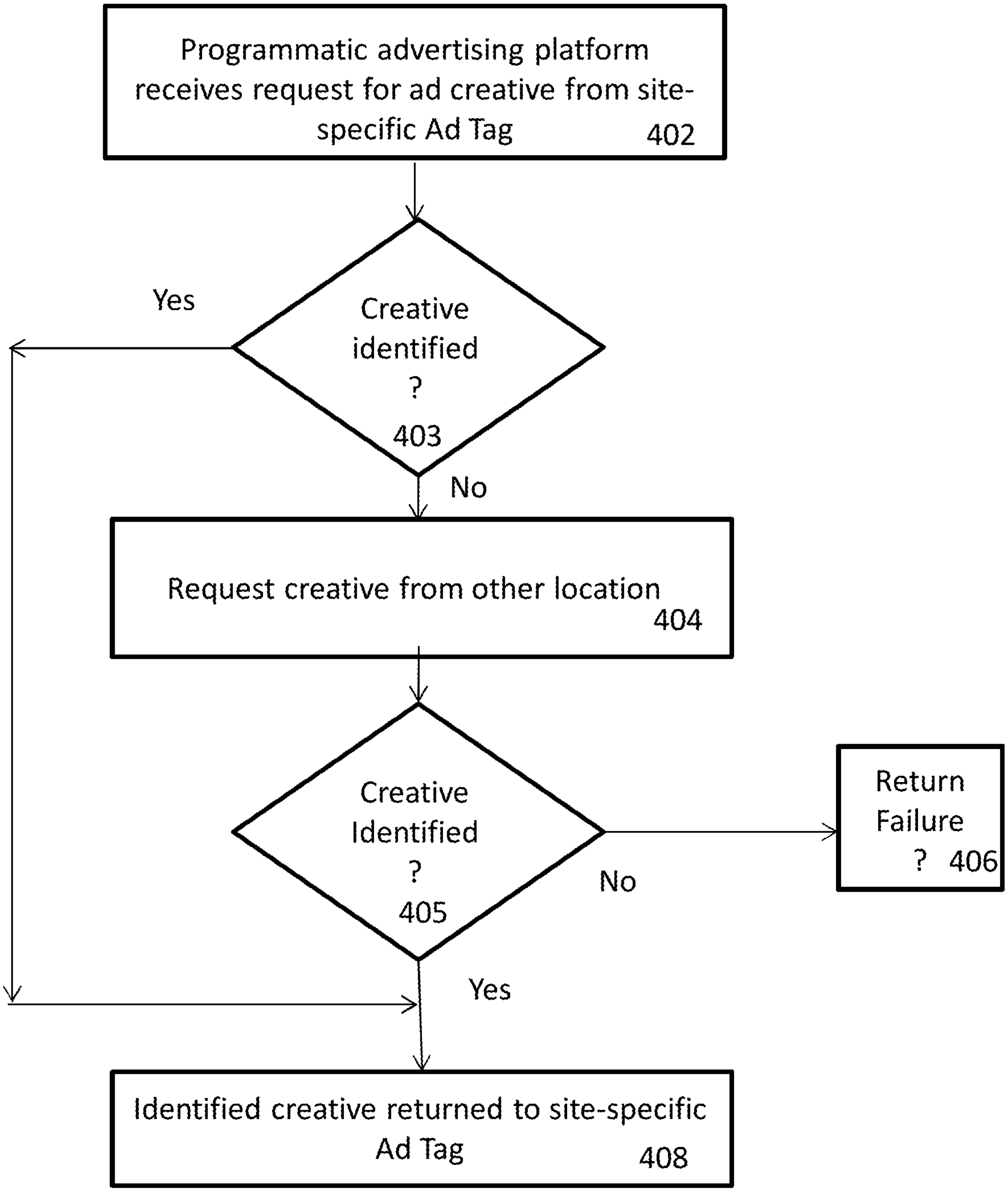
FIG. 4 depicts an exemplary sequence of steps followed by an embodiment of the present invention to retrieve an ad creative using a site-specific Ad Tag.

FIG. 4 depicts an exemplary sequence of steps followed by an embodiment of the present invention to retrieve an ad creative using a site-specific Ad Tag. The sequence begins with the site-specific Ad Tag sending a request for an ad creative to a programmatic advertising platform (step 402). In one embodiment, the programmatic advertising platform is associated with the host server. As described above, the request may be formed by the site-specific Ad Tag based on a combination of previously defined configuration data specific to the publisher website and data dynamically retrieved from external sources that relates to the user requesting the web page and/or site/page related data. If the programmatic advertising platform identifies an ad creative meeting the request parameters (step 403), the responsive ad creative is returned to the site-specific Ad Tag for display on the publisher web page (step 408). If the programmatic advertising platform is unable to identify an ad creative meeting the request parameters (step 403), the request may be sent to a different location to attempt to identify a responsive ad creative (step 404). For example, the request may be sent to a DFP account associated with an entity controlling the host server or may be sent to a third party location providing ad creatives that is not associated with the entity controlling the host server. If a responsive ad is identified (step 405), the responsive ad creative is returned to the site-specific Ad Tag for display on the publisher web page (step 408). Alternatively, if no responsive ad can be identified (step 405), a failure message may be returned to the site-specific Ad Tag (step 406). Depending on implementation, the site-specific Ad Tag may respond to the failure to serve a responsive ad in a number of ways. For example, a default ad creative from the host server may be displayed, the request may be edited to include more expansive parameters that are easier to satisfy and resubmitted, the ad slot may be left unfilled by the site-specific Ad Tag and reported to the Ad Server so the publisher can fill with its own ad creative, etc.

Figure 5:
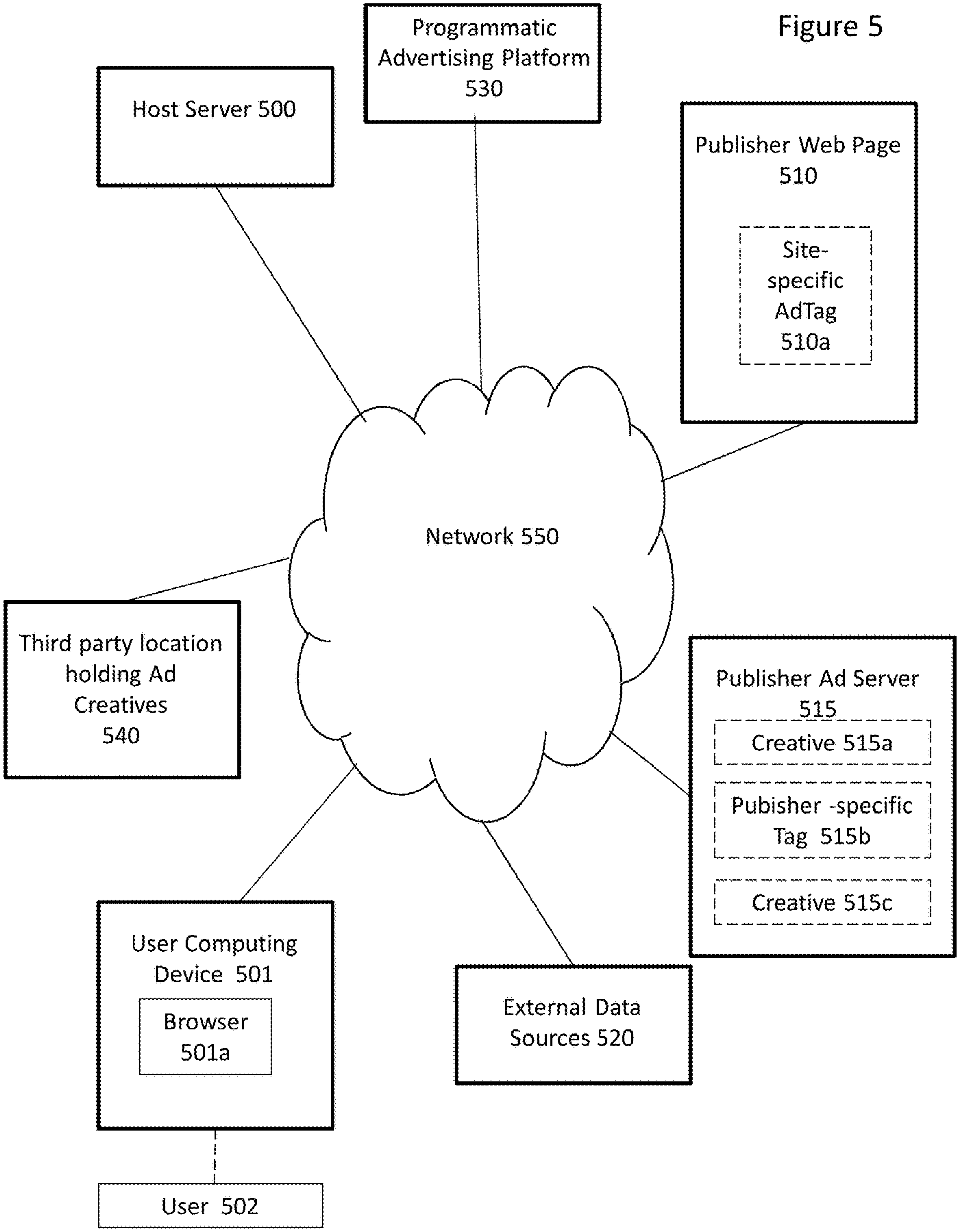
FIG. 5 depicts an exemplary network environment suitable for practicing embodiments of the present invention.

FIG. 5 depicts an exemplary network environment suitable for practicing embodiments of the present invention. A host server 500 is in communication over a network 550 with a publisher web page 510 hosted by a publisher server (not shown). Network 550 may include, but is not limited to, the Internet, an intranet, a LAN (Local Area Network), a WAN (Wide Area Network), a MAN (Metropolitan Area Network), a wireless network, an optical network, and the like. A user 502 may attempt to access publisher web page 510 via user computing device 501 and web browser 501*a* running thereon. User computing device 501 may be a personal computer, laptop, tablet, smartphone, netbook or some other type of computing device equipped with a processor, memory and a web browser. Upon receiving the request from the web browser 501*a* to access publisher web page 510, the web page may communicate with publisher ad server 515 to retrieve ad creatives to fill ad slots on the web page. The request for ad creatives may result in the publisher ad server 515 returning ad creative 515*a*, publisher specific tag 515*b* and/or ad creative 515*c*. When publisher-specific tag 515*b* is loaded on web page 510, it automatically requests the code for site-specific Ad-Tag 510*a* from host server 500. FIG. 5 depicts site-specific Ad Tag 510*a* after its retrieval from host server 500.

Continuing with the description of FIG. 5, when site-specific Ad Tag 510*a* is loaded on web page 510, its execution causes it to retrieve external data from external data sources 520 over network 550. As discussed above, in one embodiment, the external data may relate to the requesting user, user computing device 501 and/or site visit metrics with respect to web page 510. Authorized external data sources for the specific publisher may be listed or otherwise indicated in the configuration data contained within Ad Tag 510*a*. Once retrieved, the site-specific Ad Tag uses the external data to form targeting parameters that in combination with the configuration data form the basis of a request for an ad creative sought for display on web page 510. Site-specific Ad Tag 510*a* may send the request to ad creative sources in sequence or parallel until a responsive ad creative is retrieved. For example, in one embodiment, site-specific Ad Tag 510*a* may send the request for an ad creative first to programmatic advertising platform 530 and if unsuccessful, may send the request to a third party location holding ad creatives 540 such as a third party publisher not associated with either the entity controlling host server 500 or the publisher hosting web page 510. Alternatively, the request may be sent to other locations affiliated or not affiliated with host server 500. If a responsive ad creative is identified, it is returned to site-specific Ad Tag 510*a* for display on web page 510. As noted above, site-specific Ad Tag 510*a* may override advertiser configuration settings in certain circumstances before displaying the responsive ad creative if the settings conflict with publisher rules included in or accessible to the site-specific Ad Tag. Alternately, the site-specific Ad Tag 510*a* may adjust a publisher configuration setting if necessary for an advertising campaign. Once the web page 510 has loaded the ad creative, the web page may be returned to the requesting web browser 501 on the user computing device 501.

Figure 6:
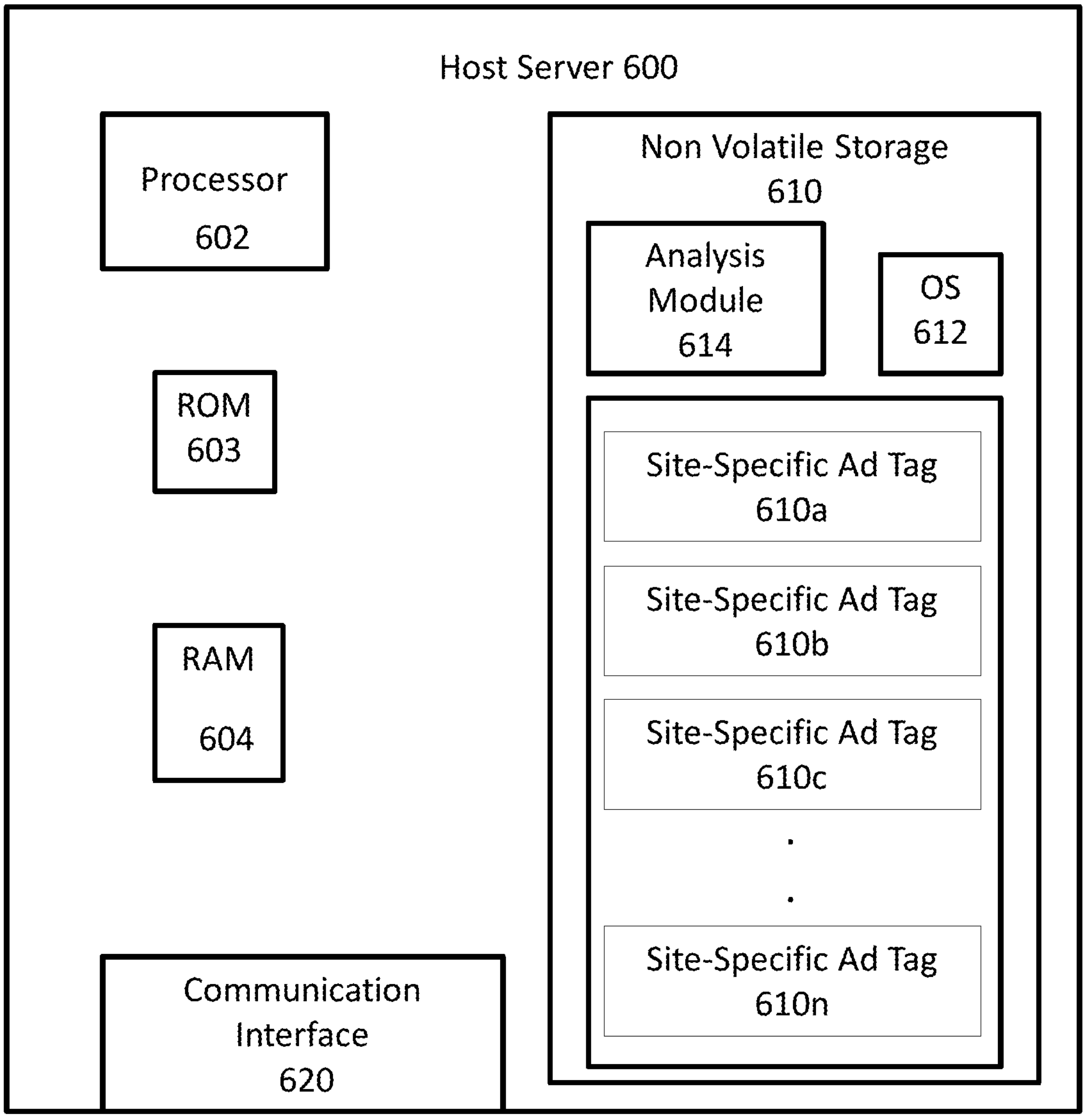
FIG. 6 depicts an exemplary host server in an embodiment of the present invention.

FIG. 6 depicts an exemplary host server in an embodiment of the present invention. Host server 600 may be a server, desktop computing device, tablet computing device, laptop or some type of other electronic device equipped with one or more processors 602. Host server 600 also includes memory in the form of non-volatile Read Only Memory (ROM) 603 and volatile Random Access Memory (RAM) 604. ROM 603 may be, but is not limited to ROM, PROM. EPROM, EEPROM, and Flash ROM. Host server 600 also includes or has access to non-volatile storage 610 such as one or more hard disk drives holding an operating system 612. Host server 600 also includes a communication interface 620 suitable for communicating over a network, such as network 550. Host server 600 may also store, or have access to multiple site-specific Ad Tags 610*a*, 6210*b*, 610*c* . . . 610*n* for one or more publishers. As discussed above, site-specific Ad Tags include sets of configuration data for publisher web sites. In one embodiment, non-volatile storage may also hold an analysis module that may be loaded into RAM 604 for execution. Analysis module 614 may include one or more algorithms for analyzing digital survey results and performance data in order to optimize a digital advertising campaign as explained in more detail below.

Accordingly, it will be appreciated that the site-specific Ad Tag of the present invention may use data collection tools to determine a set of targeting segments for visitors to a page, may use website configurations and approvals to determine what formats can go on a web page, and may use this information to properly target an ad in a publisher-customized manner. The site-specific Ad Tag allows for a waterfall process that attempts to find a valid ad response from multiple sources (including through the use of programmatic deals, direct campaigns and passback sources), more efficiently filling web page inventory with suitable ads. When an ad creative is returned, the site-specific ad tag ensures that it renders properly on the web page. The site-specific Ad Tag may reference the format type and property-specific format configurations used to determine proper DOM manipulation.

Although the embodiments described herein have discussed the display of ad creatives on a publisher web page, it should be appreciated that the embodiments of the present invention are not limited to ad creatives displayed on a publisher web page but may include ad creatives displayed on other types of digital properties. As non-limiting examples, the ad creatives may be displayed as part of an on-demand digital placement such as publisher software apps (IOS, Android™, etc.), social media apps (Snapchat™, Kik™), content readers (Apple News Reader™, Facebook Instant Articles™) and the discussions herein related to the display of ad creatives on publisher web sites and publisher web pages should be understood to also be applicable to the display of ad creatives in different contexts other than a publisher web site and/or web page.

In another embodiment, instead of the site-specific Ad Tag being requested from, and dynamically pulled from, the host server at the time of the request for the ad creative, the site-specific Ad Tag may be preloaded on the publisher web page. In such a circumstance, the publisher web page does not retrieve the site-specific Ad Tag at the time of a request for the ad creative as the site-specific Ad Tag is already loaded automatically in the web page.

In one embodiment, instead of the site-specific Ad Tag holding configuration data that is specific to a particular publisher's website, the site-specific Ad Tag may hold a default configuration for a generic website with pre-defined configuration data (it will be appreciated that in such a case the site-specific Ad Tag will not in fact be "site-specific").

Campaign Optimization

Embodiments of the present invention may also provide a dynamic optimization technique for digital advertising campaigns. In one embodiment, using survey results from digital surveys of pre-segmented audience groups, combined with performance data from delivered ad creatives, brand lift provided by survey ad units and digital properties in a digital advertising campaign may be programmatically determined during a campaign flight. In one embodiment, the performance data used in evaluating brand lift may be identified in part using site-specific Ad Tags as described herein.

Advertisers evaluating the effectiveness of a digital advertising campaign seek to determine which features of the ad campaign provide or enhance desired attributes for the brand at the heart of the campaign. Most digital advertising campaigns have a set of objectives or measures of success. For example, one success metric for advertising campaigns are percentage of the advertising served that was recorded as in-view by the consumer (viewability). A campaign sponsor may want to ensure that all the ad creatives served during a campaign are actually seen by consumers instead of by machines (aka bots that crawl the site) or are served in a placement that was never scrolled into view. Accordingly the campaign initiator may want to adjust its campaign to focus on ad creative types or websites that offer the highest viewability % (e.g.: determining which publisher digital properties displaying specific types of ad creatives in combination will provided a higher % of the ads that were viewed for a minimum amount of time in accordance with best practices. However, this determination of the attainment of campaign objectives of an ongoing digital advertising campaign may be difficult to perform as only certain ad units are truly viewable and those that are cannot usually be served on the same page at the same time.

Embodiments of the present invention address the challenge of dynamically optimizing a digital campaign during campaign flight by using performance data gathered in part by site-specific Ad Tags in combination with digital survey results provided by users during the campaign. The performance data and survey results may be used to programmatically determine which ad creatives and/or websites are providing brand lift. The providing or enhancing of desired attributes for the brand that is the focus of the campaign is referred to herein as "brand lift". Once a determination is made as to which ad creatives or websites are contributing to brand lift, the allocation of ad creatives among the websites in the advertising campaign may be dynamically adjusted.

In one embodiment, the performance of an ad creative and/or the website the ad creative is displayed on may be monitored at least in part using a site-specific Ad Tag (it will be appreciated that the monitoring of the performance of the ad creative on a particular website may also be supplemented with other data collection tools in addition to or in place of a site-specific Ad Tag). The site-specific Ad Tag may collect various performance data during the advertising campaign flight including impression data, time and engagement levels of a user and other types of data. As the site-specific Ad Tag is integrated with a host server delivering the campaign, the information may be more efficiently tracked by the host server which enables quicker optimizations of digital ad campaigns versus sending this data back to the Advertiser for programmatic processing. The site-specific Ad Tag data can also be utilized for collecting non-performance related data that may be used as a variable for optimizing performance. Examples of other data that could be used include editorial categories or content types, keywords that appear in editorial articles, and metadata including, for example, referring URL data to enhance media targeting capabilities. The collected data may be referred to generally herein as "performance data". This performance data may include both explicit and implicit data.

In one embodiment, the process of optimizing a digital advertising campaign is based in part on results taken from a digital survey that is served during the campaign's flight. The digital surveys rely on a control/exposed methodology and are discussed further below. The digital survey results are combined with the performance data across various digital advertising dimensions and programmatically analyzed to produce a relative score which is used by advertisers and agencies for campaign optimizations. This score is developed through a series of statistical models and machine learning algorithms and simulations to provide validity and the statistical significance of each permutation of potential media attributes combinations.

To prepare for the digital surveys, a potential target audience is segmented into a control and exposed groups. These audiences are mutually exclusive from the standpoint of seeing each other's ad while maintaining overall campaign targeting criteria. This can be achieved by utilizing the audience partition capabilities in the Ad Server or in the Data Management Platform. In which the control group receives either public service announcements or different advertisements than the exposed audience. Subsequently these two audience groups are served advertising media in parallel, and once a user is shown an ad creative, the Ad Tag identifies these users as being exposed to the control or exposed to the specific ad and are then placed into audience lists that exist within either the Data Management Platform (DMP) or are eligible for ad retargeting by means of the Ad Server. These remarketable users are hence eligible to be served an ad unit in the form of a survey. These digital surveys are trafficked across available ad inventory to intercept the remarketable audience segments whom are then served the digital survey ad unit. Such a survey may test whether such audience recalls the messaging of the specific ad verses that of the control group which was not exposed.

Once users are served with the digital survey ad unit, they have the option to participate or to ignore it. Participating users have their survey responses results sent to a database. For example, the database may be a cloud-based database. This database may also contain impression level data or other performance data for the ad unit but also the audience identifier (control/exposed) to partition data in the database. For example, this bridge may be provided by a key identifier provided by a data management platform (DMP), digital cookies or device or user identifiers.

In one embodiment, the performance data and the digital survey result data is cumulated and the data is structured into a form that can be processed against certain algorithms or tested against proposed hypotheses. The data may then be fed into a combination of survival analysis, Markov Chain Monte Carlo (MCMC) simulations, collaborative filtering and relative importance algorithms also known as a machine learning ensemble. By programmatically identifying which digital attributes from the ad creatives (i.e. which ads, which digital properties, etc.) drive the highest brand lift, as an example, compared to the control and then using collaborative filtering on the multivariate data set, and focusing on the brand lift variable as the response variable and site, demographic and creative elements are all part of the explanatory variable the patterns in the data can be recognized and then later replicated to produce higher results. In one embodiment, the algorithms are executed on the host server.

These attributes can then be acted upon by agencies and advertisers to optimize a campaign. For example, while the campaign is still ongoing, ads may be directed in greater volume to those digital properties providing greater brand lift and in lesser volume to those digital properties providing undesirable results. Similarly, ad creatives whose display provides an increase in target attributes can be increased within the campaign while those failing to provide the desired attributes may be reduced in allocation across the digital properties taking place in the digital advertisement campaign.

Figure 7:
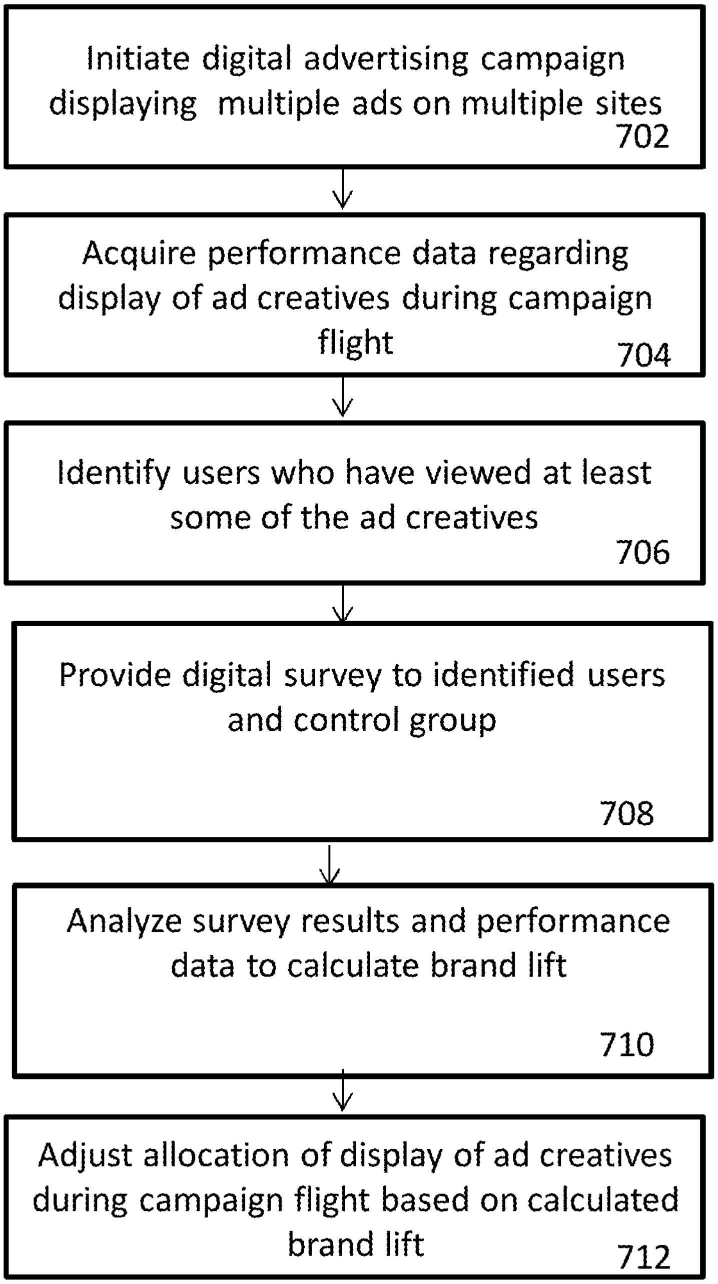
FIG. 7 depicts an exemplary sequence of steps followed by an embodiment of the present invention to optimize a digital advertising campaign

FIG. 7 depicts an exemplary sequence of steps followed by an embodiment of the present invention to optimize a digital advertising campaign. The sequence begins with the initiation of a digital advertising campaign displaying multiple ads on multiple digital properties (step 702). For example, in one embodiment, when a mobile device user visits a property taking part in the digital advertising campaign such as a web page, in app, or social media site, etc. during a campaign flight, the property requests an advertisement from their ad server. The ad server responds with a publisher-specific JavaScript tag that once loaded on the user's device retrieves and loads the full JavaScript of a site-specific Ad Tag from the host server as explained above. The site-specific Ad Tag stores relevant data about an ad impression. The data about the ad impression may be used as targeting parameters during the campaign flight, as may data about content and device type. The site-specific Ad Tag may request an ad creative from the host ad server or other source of creatives. If a campaign contains a creative matching the request parameters, that ad will be displayed on the property as opposed to other ad creatives that may have some but not all of the matching data. The site-specific Ad tag is configured to render creatives correctly for every website in the host server's network using publisher-specific configuration data.

During the display of ad creatives, performance data is gathered with respect to the ad creatives and/or the websites the ad creatives are being displayed on (step 704). In one embodiment, this performance data is gathered at least in part by a site-specific Ad Tag integrated with a host server used in the delivery of the campaign. The performance data may include data such as user time and engagement levels. In another embodiment, the performance data may be gathered by an SDK in app or provided by third party data transmitted to the host server. Users who have viewed at least some of the ad creatives from the campaign are identified (step 706) and a digital survey is provided both to users exposed to certain ad creatives in the campaign and a control group of users who have not been exposed to those ad creatives (step 708). These surveys may be provided during the campaign flight. The survey results and performance data are then used to programmatically calculate the brand lift or other desired performance attributes provided by ad creatives in the campaign and/or the digital properties used to deliver the ad creatives to the users (step 710). An allocation of the displayed ad creatives and digital properties in the campaign can then be adjusted during the campaign flight based on the calculated brand lift or other performance results (step 712). This reallocation of ad creatives to adjust the campaign can occur throughout the time period the campaign is scheduled to run. In one embodiment, the campaign can be adjusted directly through the Ad Server or via the site-specific Ad Tag. Depending on how the campaign was transacted (programmatically or via managed service), the host server or the advertiser will be adjusting the campaign. In the case of a programmatic campaign, the advertiser has complete control over pacing, launching and trafficking in their ad server so they will be adjusting campaigns to perform better against their success metrics. If the campaign is running via managed service, a host server adjusts the campaign using their own ad server. The host server may optimize campaigns at regular frequencies (i.e. the number of times a user can see an ad creative) with cadence (the time it takes users to see the specified frequency of ad creative) being determined by length of campaign flight to ensure the campaign will deliver against its success metrics, and will deliver all its forecasted impressions.

Figure 8:
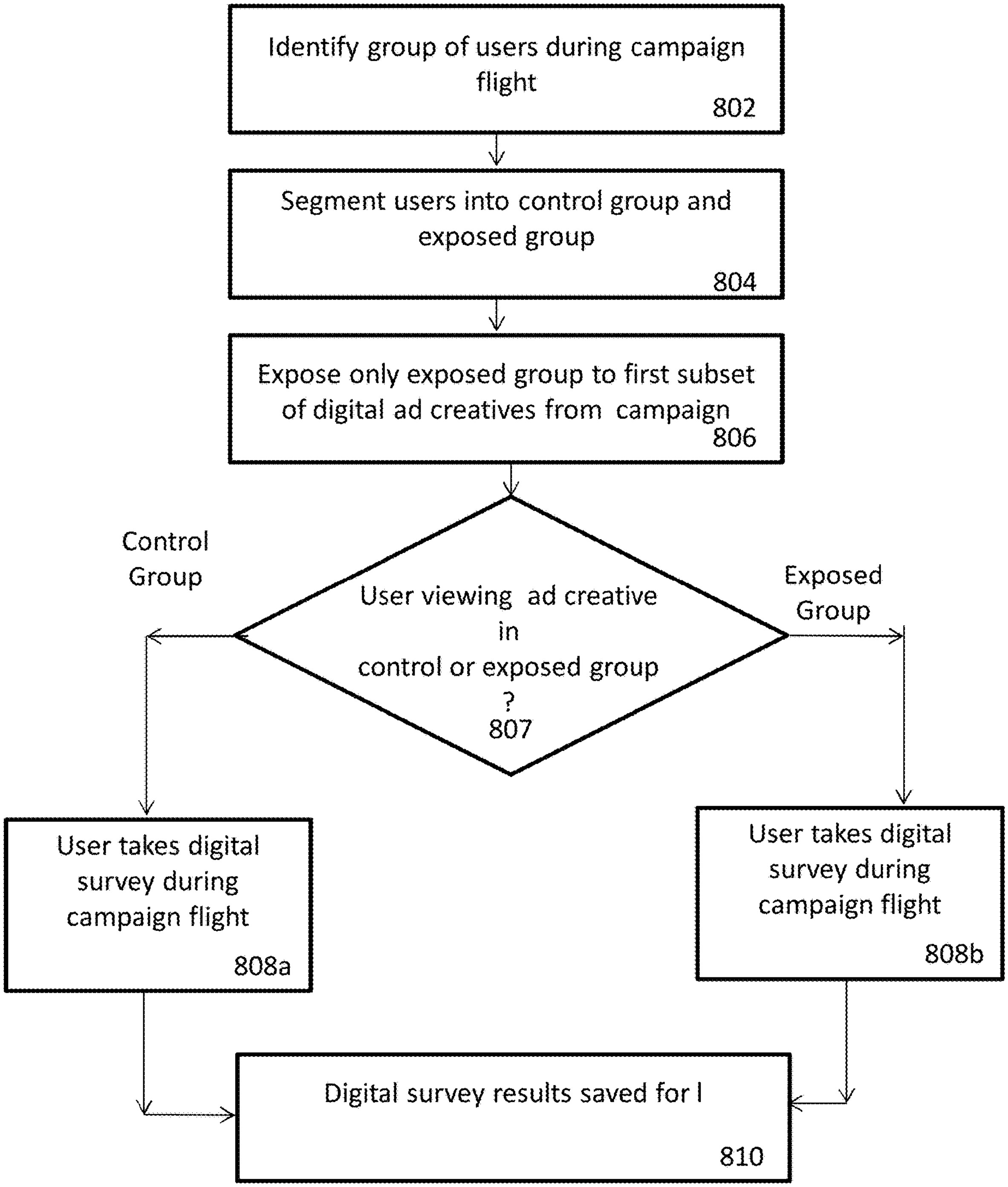
FIG. 8 depicts an exemplary sequence of steps followed by an embodiment of the present invention to perform digital surveys during a campaign flight.

FIG. 8 depicts an exemplary sequence of steps followed by an embodiment of the present invention to perform a digital survey of users as part of a campaign optimization process. The sequence begins with the identification of a group of users during a campaign flight (step 802). The users are segmented into a "control" group and an "exposed" group (step 804). The exposed group is exposed to a first subset of one or more ad creatives from the campaign (step 806). The control group is not exposed to this first subset of ad creatives. Subsequently a user viewing an ad creative during the campaign flight is identified as belonging to either the control or exposed group (step 807). The user is then given the opportunity to take a digital survey (808*a* or 808*b*) and the survey results from accepting users are saved as survey result data for the appropriate control or exposed group (step 810). The questions in the digital survey may vary with the advertiser brand objectives. Answers from the users may be of the single answer select or the multi answer select variety. This survey result may be combined with the gathered performance data to programmatically determine brand lift.

In another embodiment patterns of response and behavior by consumers may be programmatically detected and used to optimize the display of ad creatives without the use of a digital survey. Performance data relating to real-time behaviors and feedback from how users react to the units may be acquired. For example, user engagement with an ad creative, watching a video to completion, time spent on screen, taking a certain action, etc. may be monitored by a site-specific Ad Tag as described herein, or by an SDK. The performance data may also be provided to the host server by a third party. The performance data may be analyzed with suitable algorithms to identify patterns of behavior and an advertising campaign may be optimized accordingly based on the results.

Embodiments also may provide a technique to develop and optimize target audiences. Advertisers look to target campaigns to a particular audience that is assumed to drive campaign key performance indicators (KPIs). Typically, advertisers will first look to target audiences derived from declared data ("declared data" is data voluntarily provided by a user which does not need to be inferred from other data). Advertisers interested in setting up digital advertising campaigns look to use declared data such as website registration data to identify a target audience. However, obtaining this type of data at scale is a problem for most marketers.

Embodiments create a scalable audience solution that doesn't rely upon audiences derived from declared data. With access and partnerships from associated publishers, a host server is able to track the editorial consumption patterns of its users. By analyzing the editorial consumption patterns of known users, the host server is able to assign user characteristic probability scores to anonymous users, based on their editorial consumption patterns. These scores may then be used to adjust an ongoing campaign during flight or to formulate a new campaign based on which audience the campaign is reaching or wants to reach.

Embodiments may also identify undeclared data or new data types such as content consumption to create new audience data sets. For example the declared data may indicate a user belongs to the "New Dad" audience segment but there is also an option to take a "Male" user who is reading content about becoming a new dad to be placed into the segment based upon the content consumed even though he doesn't belong in the segment according to the declared data. This approach uses content types to assign users to new audience segments.

In one embodiment a host server utilizes a training set with known users and their content consumption patterns. For example, without limitation, the host server could look to identify in the training set the reading patterns of females aged 35 to 44 with household income greater than $100,000.00 a year, males 18 to 34 and/or shoppers at a particular retail store. It will be appreciated that the host server could also use the training set to identify other content consumption patterns. This training set may be accumulated in various manners including capturing demographic data sourced from registration from a number of publishers with which the host server associates. Once the training set has been accumulated, the training set is used as input for a machine learning algorithm to create a predictive model. For example, the machine learning algorithm could be used to optimized certain consumption based on brand lift (i.e. avid auto reader has higher affinity to tech products) or Users who take time to consume editorial content show high brand lift for retail ads.

The resulting model from the trained algorithm may then be utilized in an embodiment to predict user characteristics based on multiple or single page consumption. In one embodiment, performance data regarding the user page consumption may be gathered in part utilizing the site-specific Ad Tag described herein during a campaign flight. In another embodiment, the performance data may be gathered without the use of a site-specific Ad Tag. As an example, the trained algorithm may be used to determine relative scores of a user appropriate for a display of an ad creative directed to a particular retail store featuring electronics if the user reads 2 electronics articles and 1 holiday shopping article. Similarly, the user may be identified as a candidate for an ad creative directed to cheese if the user reads 1 article for cannoli recipes and 1 article for tiramisu recipes. As another example, for single pages, users may be assigned probability scores by the trained algorithm based on demographics based on their reading of a particular political article.

Figure 9:
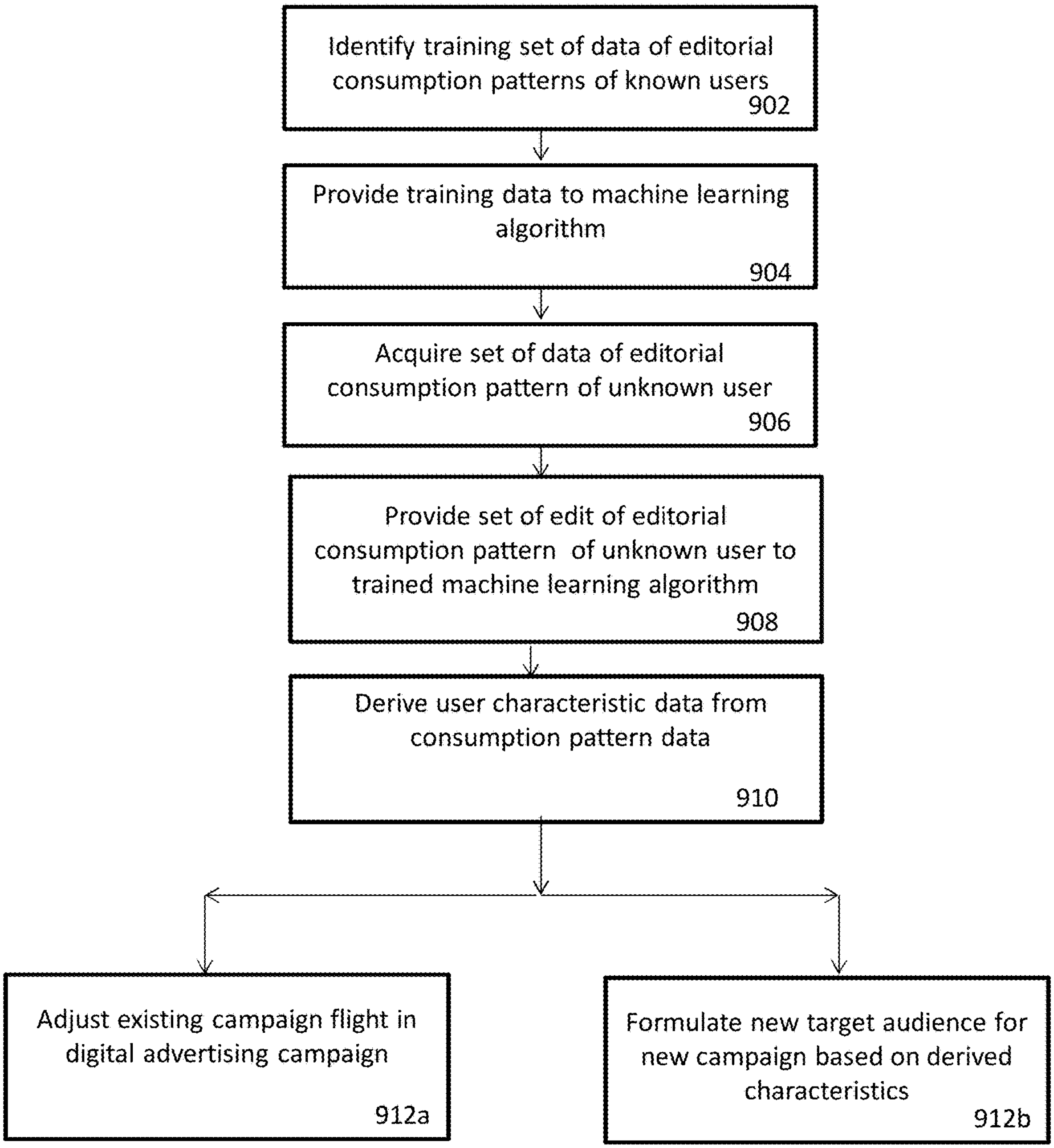
FIG. 9 depicts an exemplary sequence of steps followed by an embodiment of the present invention to derive user characteristics from editorial consumption patterns.

FIG. 9 depicts an exemplary sequence of steps followed by an embodiment of the present invention to derive user characteristic data from editorial consumption pattern data. The sequence begins with a host server identifying a training set of data of editorial consumption patterns of known users (step 902). The training data is provided as input to a machine learning algorithm (step 904). Subsequently a set of data of an editorial consumption pattern for an unknown user viewing an ad creative or other displayed content is gathered (step 906). In one embodiment, the set of data of an editorial consumption pattern for the unknown user may be gathered with the aid of the site-specific Ad Tag described herein. The set of data of an editorial consumption pattern for the unknown user is provided as input to the now trained machine learning algorithm (step 908) which derives user characteristic data from the consumption pattern data of the unknown user (step 910). These derived characteristics may be used to adjust an existing campaign flight in a digital advertising campaign during the flight (step 912*a*). Alternatively, the derived characteristics may be used to formulate a target audience for a new campaign after an existing campaign has ended.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in many computing languages.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel. It should be further appreciated that in some embodiments, the individually embodiments described herein may be combined in combinations not specifically described without departing from the scope of the present invention.

We claim:

1. A computing device-implemented method for predicting user characteristics via content consumption patterns, the computing device including one or more processors, the method comprising:

identifying a training set of data of content consumption patterns of digital data by known users;

providing the training set of data to a machine learning algorithm to create a predictive model;

acquiring a set of data of content consumption patterns of digital data by a plurality of unknown users from at least one digital property during a digital advertising campaign flight, wherein the set of data of content consumption patterns of digital data by the unknown users is gathered at least in part by a site-specific Ad Tag, the site-specific ad tag including custom configurations for ad placements on a specific digital property and further configured to request data from one or more external sources;

providing the set of data of the content consumption pattern of digital data by the unknown users to the predictive model to predict user characteristics of the unknown users; and adjusting the digital advertising campaign flight based on the predicted user characteristics.

2. The method of claim 1 wherein the set of data of content consumption patterns of digital data by the unknown users is gathered at least in part by a Software Development Kit (SDK) in app.

3. The method of claim 1 wherein an allocation of ad creatives in the digital advertising campaign flight is adjusted based on the predicted user characteristics during the digital advertising campaign flight.

4. The method of claim 1 wherein an allocation of ad creatives in the digital advertising campaign flight is adjusted in a future digital advertising campaign flight based on the predicted user characteristics.

5. The method of claim 1 wherein the training set of data of content consumption patterns of digital data by known users includes declared data provided during registration with a digital property by the known users.

6. The method of claim 1, further comprising:
adjusting the digital advertising campaign flight by increasing an allocation of ad creatives in the digital advertising campaign flight that exhibit a pre-determined level of result.

7. The method of claim 1, further comprising:
adjusting the digital advertising campaign flight by decreasing an allocation of ad creatives in the digital advertising campaign flight that exhibit a pre-determined level of result.

8. A non-transitory medium holding processor-executable instructions for predicting user characteristics via content consumption patterns, the instructions when executed causing at least one computing device equipped with a processor to:
identify a training set of data of content consumption patterns of digital data by known users;
provide the training set of data to a machine learning algorithm to create a predictive model;
acquire a set of data of content consumption patterns of digital data by a plurality of unknown users from at least one digital property during a digital advertising campaign flight, wherein the set of data of content consumption patterns of digital data by the unknown users is gathered at least in part by a site-specific Ad Tag, the site-specific ad tag including custom configurations for ad placements on a specific digital property and further configured to request data from one or more external sources;
provide the set of data of the content consumption pattern of digital data by the unknown users to the predictive model to predict user characteristics of the unknown users; and
adjust the digital advertising campaign flight based on the predicted user characteristics.

9. The medium of claim 8 wherein the set of data of content consumption patterns of digital data by the unknown users is gathered at least in part by a Software Development Kit (SDK) in app.

10. The medium of claim 8 wherein an allocation of ad creatives in the digital advertising campaign flight is adjusted based on the predicted user characteristics during digital advertising campaign flight.

11. The medium of claim 8 wherein an allocation of ad creatives in the digital advertising campaign flight is adjusted in a future digital advertising campaign flight based on the predicted user characteristics.

12. The medium of claim 8 wherein the training set of data of content consumption patterns of digital data by known users includes declared data provided during registration with a digital property by the known users.

13. The medium of claim 8, wherein the instructions when executed further cause the at least one computing device to:
adjust the digital advertising campaign flight by increasing an allocation of ad creatives in the digital advertising campaign flight that exhibit a pre-determined level of result.

14. The medium of claim 8, wherein the instructions when executed further cause the at least one computing device to:
adjust the digital advertising campaign flight by decreasing an allocation of ad creatives in the digital advertising campaign flight that exhibit a pre-determined level of result.

* * * * *